United States Patent [19]

Kime et al.

[11] Patent Number: 4,792,935

[45] Date of Patent: Dec. 20, 1988

[54] OBJECTIVE LENS DRIVING DEVICE WITH MULTIPOLE MAGNET

[75] Inventors: Kenjiro Kime, Nagaokakyo; Shigekazu Sakabe, Amagasaki; Akira Hashimoto, Nagaokakyo; Toshiya Matozaki, Gunma, all of Japan

[73] Assignee: Mitsubishi Denki K.K., Tokyo, Japan

[21] Appl. No.: 945,089

[22] Filed: Dec. 22, 1986

[30] Foreign Application Priority Data

| Dec. 27, 1985 | [JP] | Japan | 60-296376 |
| Dec. 27, 1985 | [JP] | Japan | 60-296377 |
| Dec. 27, 1985 | [JP] | Japan | 60-296378 |
| Dec. 27, 1985 | [JP] | Japan | 60-296382 |
| Dec. 27, 1985 | [JP] | Japan | 60-296383 |
| Mar. 20, 1986 | [JP] | Japan | 61-062655 |

[51] Int. Cl.$^4$ .............................................. G11B 7/00
[52] U.S. Cl. ............................................ 369/45; 250/201
[58] Field of Search .................................... 369/43–47, 369/119; 250/201 DF; 350/247, 255

[56] References Cited

U.S. PATENT DOCUMENTS

| 4,553,227 | 11/1985 | Kido, et al. | 369/45 X |
| 4,679,904 | 7/1987 | Kurihara | 369/45 X |

FOREIGN PATENT DOCUMENTS

| 0068757 | 1/1983 | European Pat. Off. |
| 0176332 | 4/1986 | European Pat. Off. |
| 1119992 | 12/1961 | Fed. Rep. of Germany |
| 6032139 | 2/1985 | Japan |

*Primary Examiner*—Robert L. Richardson
*Attorney, Agent, or Firm*—Takeuchi Patent Office

[57] ABSTRACT

An objective lens driving device with a multipole magnet which includes a cylindrical yoke with an E-shaped cross section for defining an annular gap between the central yoke section and the outer cyclindrical yoke section; four rectangular tracking coils attached to the side of a focusing coil such that a pair of vertical coil sides of each tracking coil are parallel to a supporting shaft; and a pair of circular multipole magnets disposed within the gap between the central and outer cylindrical yoke sections and each having at least three magnet sections, with opposite end magnet sections having a polarity opposite to that of the central magnet section so that the vertical coil sides interlink with magnetic fluxes having opposite directions to each other, whereby tracking forces act upon the vertical coil sides in the same direction.

15 Claims, 11 Drawing Sheets

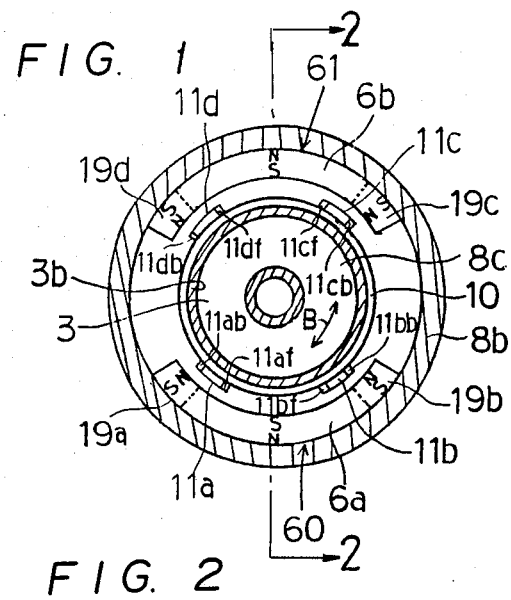
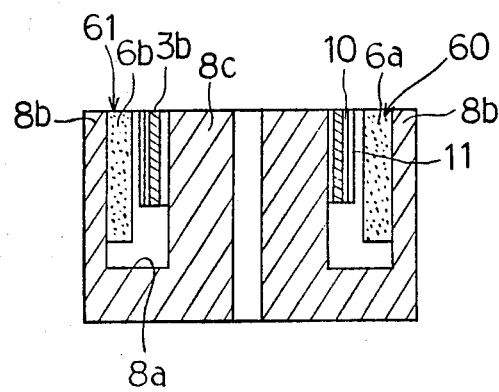
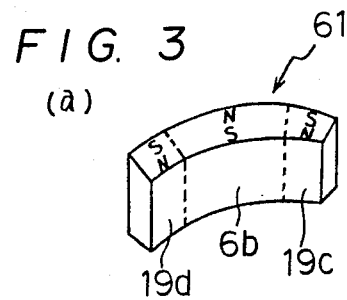
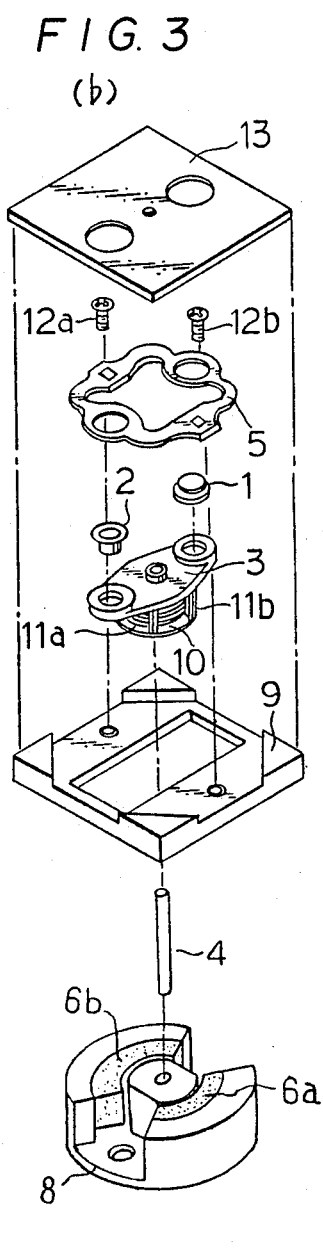

(a)

(b)

FIG. 29 Prior art
FIG. 30 Prior art
FIG. 31 Prior art
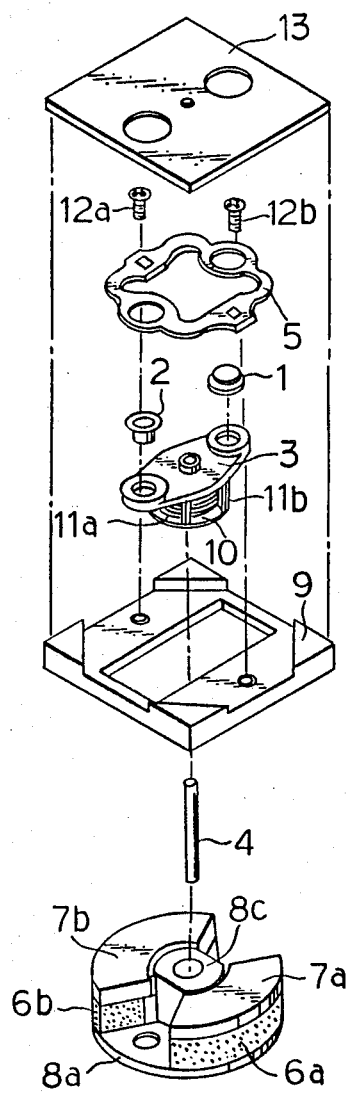
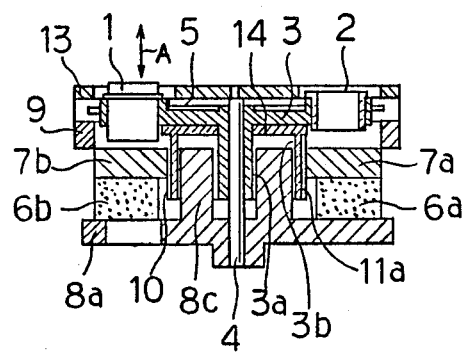
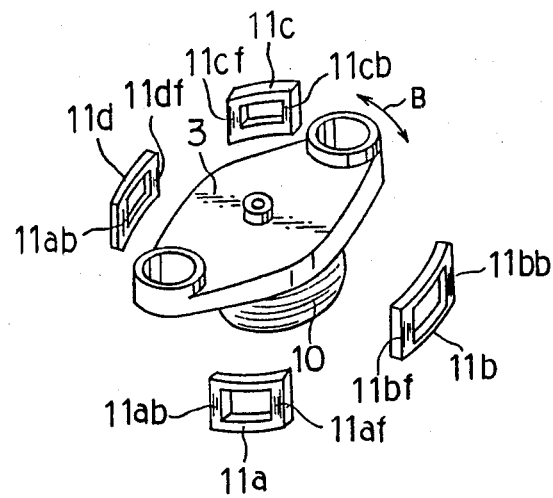

OBJECTIVE LENS DRIVING DEVICE WITH MULTIPOLE MAGNET

BACKGROUND OF THE INVENTION

The present invention relates generally to objective lens driving devices and, more particularly, to an objective lens driving device using a multipole magnet to effect both tracking and focusing in an optical pick-up.

A conventional objective lens driving device is shown in FIGS. 29 through 31. An objective lens 1 and a counter weight 2 are mounted on opposite ends of an elliptic lens holder 3. The lens holder 3 has a tubular bearing 3a and a coil holder 3m disposed concentrically on the underside. A supporting shaft 4 is inserted in the tubular bearing 3a to support the lens holder 3 in such a manner that the lens holder 3 may move both in a vertical direction as shown by an arrow A in FIG. 30 and in a rotational direction as shown by an arrow B in FIG. 31. An elastic holder 5 is used to hold the lens holder 3 to permit such bi-directional movement of the lens holder 3.

A pair of permanent magnets 6a and 6b are disposed so that the upper ends (and lower ends) of the respective magnets have opposite polarities. A pair of yokes 7a and 7b are placed on top of the permanent magnets 6a and 6b. A disk-shaped yoke or holding base 8a supports the supporting shaft 4 and the permanent magnets 6a and 6b. A tubular central yoke 8c is made integrally with the disk-shaped yoke 8a.

The elastic holder 5 is secured to a rectangular base 9 with a pair of screws 12a and 12b. A focusing coil 10 is mounted on the underside of the lens holder 3. Four tracking coils 11a, 11b, 11c, and 11d are attached to the side of the focusing coil 10 at equal intervals. A cover 13 is joined to the holding base 9 at four corners to complete a movable lens assembly.

The bearing 3a is disposed inside the central yoke 8c, while the coil support 3b made integral with the coil holder 3m is disposed outside the central yoke 8c. The focusing coil 10 is wound around the cylindrical coil support 3b, and the tracking coils 11a, 11b, 11c, and 11d are fixed to the side of the focusing coil 10 so as to cover part of the outside thereof. Each tracking coil 11a–11d is wound in a rectangular shape to have a pair of vertical sides 11ab and 11af, 11bf and 11bb, 11cb and 11cf, or 11df and 11db, each extending in parallel to the supporting shaft 4. These coils and permanent magnets produce a force for moving the lens holder with the objective lens.

In operation, by flowing a certain amount of electric current through the focusing coil 10, the lens holder 3 is moved in the vertical direction shown by the arrow A in FIG. 30 to focus the objective lens 1. When electric currents are flown through the tracking coils 11a–11d, forces acting upon the vertical coil sides 11af, 11bf, 11cf, and 11df rotates the lens holder 3 with the objective lens 1 in either direction, depending on the direction of the current, shown by an arrow B in FIG. 31. In this way, tracking control is carried out.

In the conventional objective lens driving device such as described above, the focusing coil 10 and the tracking coils 11a–11d use the same magnetic circuit made up of the permanent magnets 6a and 6b and the yokes 7a, 7b, 8a and 8c. The permanent magnets 6a and 6b produce magnetic fluxes running in one direction; e.g., from the yokes 7a and 7b to the central yoke 8c so that forces act on only one vertical coil side 11af, 11bf, 11cf, or 11df of each tracking coil 11a–11d to move the lens holder 3 in the direction shown by the arrow B. In other words, both the vertical coil sides are not used to move the lens holder 3 in the direction of the arrow B because the magnetic fluxes acting on both the vertical coil sides 11af and 11ab, 11bf and 11bb, 11cb and 11cf, and 11df and 11db have the same direction, thus reducing the efficiency of the tracking coils 11a–11d.

Consequently, this low efficiency makes it necessary to increase the number of windings and the coil size in order to provide the required torque. The large coils, however, not only fails to meet a recent demand for miniature coils but also expensive.

SUMMARY OR THE INVENTION

Accordingly, it is an object of the invention to provide an objective lens driving device using a magnet with multiple poles to provide the increased efficiency of small tracking coils with a small number of windings.

Another object of the invention is to provide an objective lens driving device with the increased efficiency using a small number of components.

Still another object of the invention is to provide an objective lens driving device with low magnetic flux resistance.

Yet another object of the invention is to provide an objective lens driving device for positioning an objective lens with high accuracy.

BRIEF DESCRIPTION OF THE DRAWINGS

FIG. 1 is a plan view of an objective lens driving device according to an embodiment of the invention;

FIG. 2 is a sectional view taken along the line 2—2 of FIG. 1;

FIG. 3(a) is a perspective view of a permanent magnet useful for both tracking and focusing control in the objective lens driving device;

FIG. 3(b) is an exploded view of the objective lens driving device;

FIG. 29 is an exploded perspective view of an objective lens driving device according to the prior art;

FIG. 30 is a sectional view of the driving device of FIG. 29; and

FIG. 31 is an enlarged exploded perspective view of part of the driving device of FIG. 29.

DESCRIPTION OF THE PREFERRED EMBODIMENT

Figure 4:
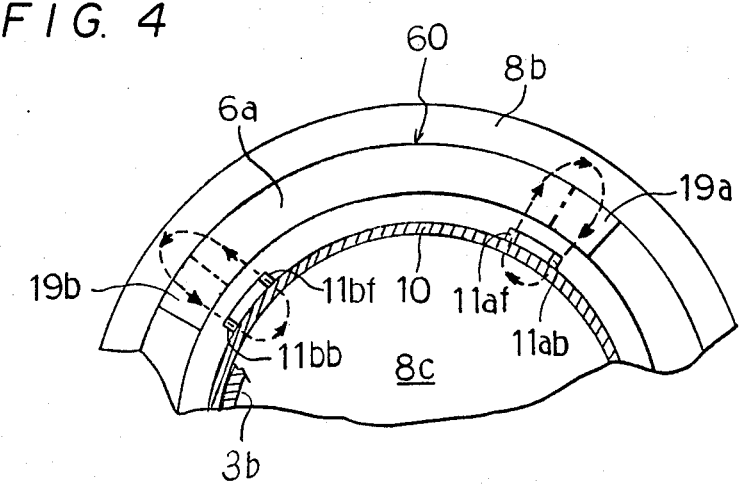
FIG. 4 is an enlarged plan view of part of the objective lens driving device showing the directions of magnetic fluxes.

In FIGS. 1 through 3, a focusing coil 10 is wound around a coil supporting tubular body 3b extending downwardly from the bottom of a lens holder 3. Four tracking coils 11a, 11b, 11c, and 11d are attached to the outside of the focusing coil 10 at equal intervals. Each tracking coil 11a-11d is wound in a rectangular shape. A pair of permanent magnets 60 and 61 are disposed on the periphery of a disk-shaped yoke 8a. The permanent magnet 60 has a pair of tracking sections 19a and 19b and a central section 6a for both tracking and focusing control. Similarly, the permanent magnet 61 has a pair of tracking sections 19c and 19d and a central section 6b.

The permanent magnet 60 is disposed so that the central section 6a faces the vertical sides 11af and 11bf of the tracking coils 11a and 11b while the tracking sections 19a and 19b face the vertical side 11ab of the tracking coil 11a and the vertical side 11bb of the tracking coil 11b, respectively. Similarly, the permanent magnet 61 is disposed so that the central section 6b faces the vertical sides of 11cf and 11df while the tracking sections 19c and 19d face the vertical side 11cb of the tracking coil 11c and the vertical side 11db of the tracking coil 11d, respectively.

The permanent magnets 6a and 6b each are made of plastic magnet which has been magnetized in radial directions. That is, the central section 6a or 6b has the north pole on the outside and the south pole on the inside while the tracking sections each has the south pole on the outside and the north pole on the inside. Consequently, the south poles of the central sections 6a and 6b face the vertical coil sides 11af and 11bf, and 11cf and 11df, respectively, while the north poles of the tracking section 19a and 19b, and 19c and 19d face the vertical coil sides 11ab and 11bb, and 11cd and 11db, respectively, so that magnetic fluxes of different polarities are provided. In other words, for the tracking coil 11b, a magnetic flux running from the interior to the exterior is applied to the vertical coil side 11bf and a magnetic flux running from the exterior to the interior is applied to the vertical coil side 11bb. Provided along the periphery of the disk-shaped yoke 8 is a outer cylindrical yoke 8b on the inside of which the permanent magnets 60 and 61 are secured. By flowing a certain current through the tracking coils 11a-11d which are disposed in the magnetic fluxes running between the inner and outer yokes 8c and 8b in the directions as described above, the lens holder 3 may be rotated in either direction shown by the arrow B in FIG. 1.

FIG. 4 shows the directions of the magnetic fluxes in more detail. Since the directions of the magnetic fluxes and electric currents running through the coil sides 11af and 11ab, and 11bf and 11bb are opposite, respectively, the torques acting on the coil sides have the same direction. That is, the vectors of a magnetic flux interlinking with the opposing coil sides 11ab and 11af are different in direction by an angle of 180 or less but above 90 degrees. According to the invention, there is provided the outer yoke 8b on the inside of which the permanent magnets are secured so that the space between the permanent magnets and the tracking coils may be kept accurate.

Figure 5:
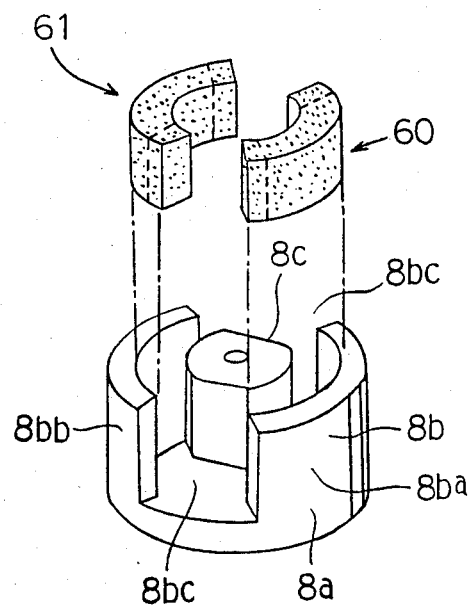
FIG. 5 is an exploded perspective view of the permanent magnets and the yoke useful for the objective lens driving device.
Figure 6:
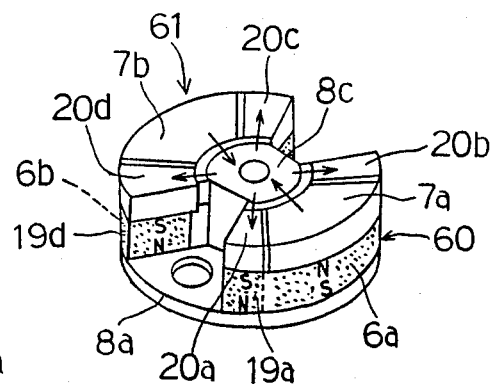
FIG. 6 is a perspective view of the permanent magnets mounted between the yokes.
Figure 7:
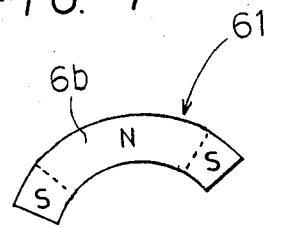
FIG. 7 is a plan view of the permanent magnets arranged for controlling both tracking and focusing of the objective lens.
Figure 8:
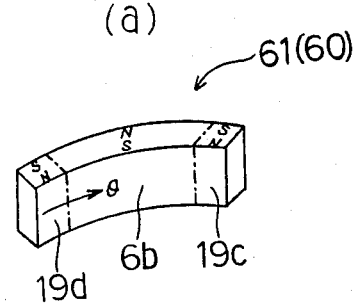
FIG. 8(a) is a perspective view of a permanent magnet according to another embodiment of the invention.
FIG. 8(b) is a graph showing the magnetomotive force with respective to the rotational position.
Figure 8:
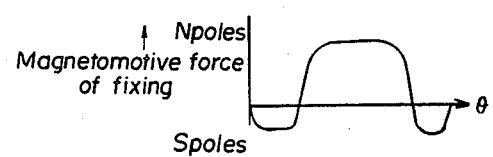

In FIG. 5, the outer yoke 8b is provided with a pair of notches 8bc, dividing it into a pair of yoke pieces 8ba and 8bb. The permanent magnets may be further miniaturized by using a rare earth element in place of the plastic magnet. As shown in FIGS. 6 and 7, the permanent magnet may be also miniaturized by orienting the polarity in the direction of thickness. That is, the central section 6a has the north pole on the top and the south pole on the bottom, while the tracking sections 19a and 19b have the south pole on the top and the north pole on the bottom. The permanent magnet 61 is identical with the permanent magnet 60. Six separate top yoke pieces 7a, 7b, 20a, 20b, 20c, and 20d are provided on top of the permanent magnets 60 and 61 to complete six magnetic circuits, for which the direction of each flux is shown in FIG. 6.

According to the invention, each permanent magnet is made so as to have a plurality of different poles in the same side or surface so that the vectors of a magnetic flux interlinking with the opposing coil sides of a tracking coil makes an angle at of least 90 degrees, whereby increasing the efficiency of the tracking coil. Since all the permanent magnet sections, or the central section and the tracking sections are secured on the inside of an outer yoke, it is easy to position the permanent magnets with high accuracy by processing the outer yoke with high precision.

In FIGS. 8 through 11, the central section 6b and a pair of tracking sections 19c and 19d are integrally made to form a curved permanent magnet 61. Similarly, the central section 6a and a pair of tacking sections 19a and 19b are integrally made to form a curved permanent magnet 60. That is, the permanent magnet 61 is made by hybrid magnetization so as to have three pairs of poles in a one-piece curved magnetic material as best shown in FIG. 8(a). These permanent magnets 60 and 61 have the same functions as those of FIGS. 1-3.

FIG. 8(b) shows the magnetomotive force in the widthwise direction with respect to the length. By flowing a certain current through the tracking coils 11a-11d, the lens holder 3 may be rotated in either direction as shown by the arrow B in FIG. 1.

Figure 9:
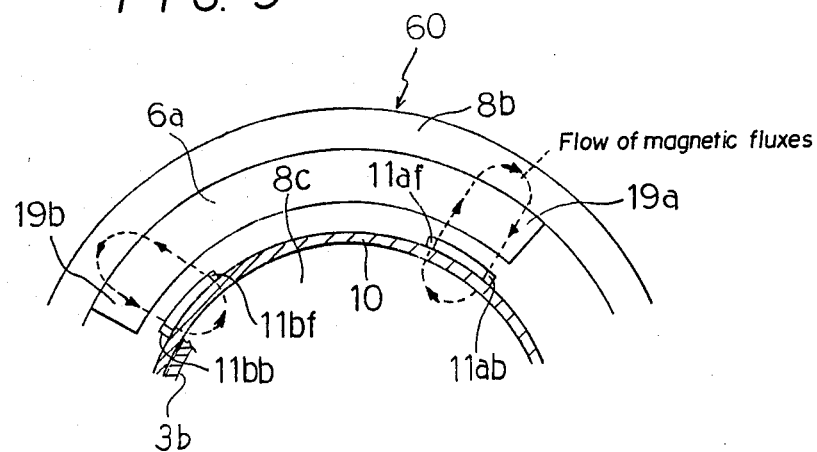
FIG. 9 is an enlarged plan view of part of the permanent magnet of FIG. 8(a)

FIG. 9 shows the directions of magnetic fluxes circulating from the tracking section 19a through the coil side 11ab, the inner yoke 8c, the coil side 11af, and the central section 6a to the outer yoke 8b, and from the tracking section 19b through the coil side 11bb, the inner yoke 8c, the coil side 11bf, and the central section 6a to the outer yoke 8b for controlling both focusing and tracking. Since the directions of electric current running through the coil sides 11ab and 11bb and through the coil sides 11af and 11bf are opposite, and the directions of magnetic fluxes interlinking with the coil sides 11ab and 11bb and with the coil sides 11af and 11bf are also opposite, all the torques acting on the coil sides have the same direction, thus increasing the efficiency of the tracking coils 11a and 11b. The same holds for the tracking coils 11c and 11d.

Figure 10:
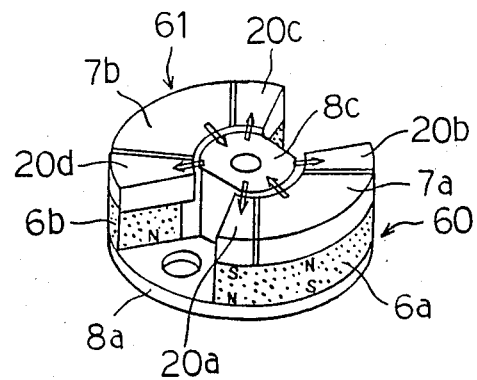
FIG. 10 is a perspective view of permanent magnets according to still another embodiment of the invention.
Figure 11:
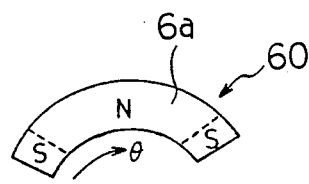
FIG. 11(a) is a plan view of one of the permanent magnets of FIG. 10.
FIG. 11(b) is a graph showing the magnetomotive force with respect to the rotational position.
Figure 11:
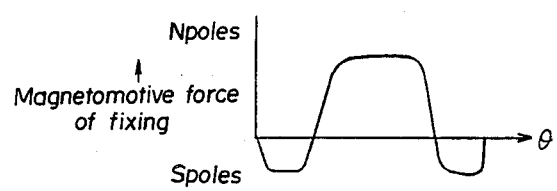

FIGS. 10 and 11 show permanent magnets each magnetized by multipolar magnetization in the thicknesswise direction. Each permanent magnet has the same functions as those of the permanent magnets shown in FIGS. 6 and 7. The magnetomotive force in the thicknesswise direction with respect to the length of the curved permanent magnet 60 is shown in FIG. 11(b). As best shown in FIG. 10, six separate top yoke pieces 7a, 7b, 20a, 20b, 20c, and 20d are provided on top of the permanent magnets 60 and 61 to complete magnetic circuits. The directions of respective magnetic fluxes are shown by arrows in FIG. 10. These magnetic fluxes are used to control both focusing and tracking.

Figure 12:
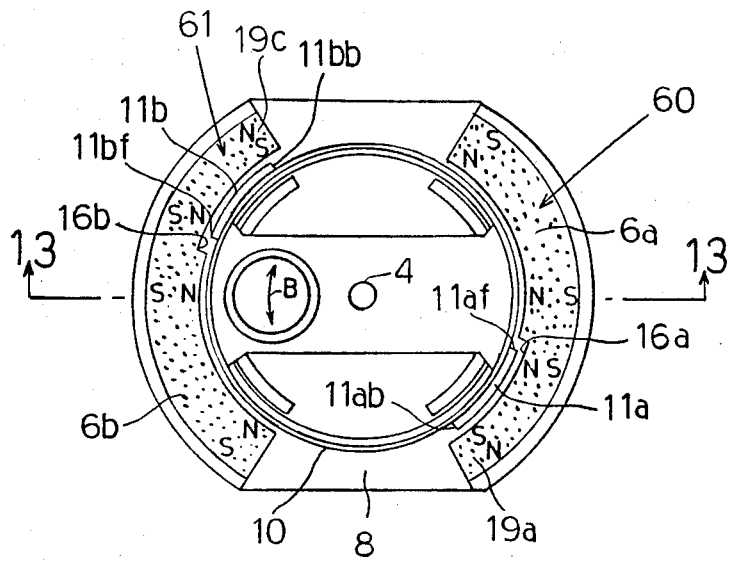
FIG. 12 is a plan view of permanent magnets according to yet another embodiment of the invention.

FIG. 12 shows an objective lens driving device according to another embodiment of the invention. The permanent magnet 60 is provided with a recess 16a on the inside across a free end of the tracking section 19a and an end of the central section 6a adjacent the tracking section 19a. A tracking coil 11a is disposed in the recess 16a. Similarly, a tracking coil 11b is disposed in the recess 16b provided on the permanent magnet 61. A focusing coil 10 is provided beneath the lens holder 3. The permanent magnet 60 is made by magnetizing a curved magnetic material so that the main section 6a has the north pole on the inside and the south pole on the outside while an end section 19a has the south pole on the inside and the north pole on the outside.

Figure 13:
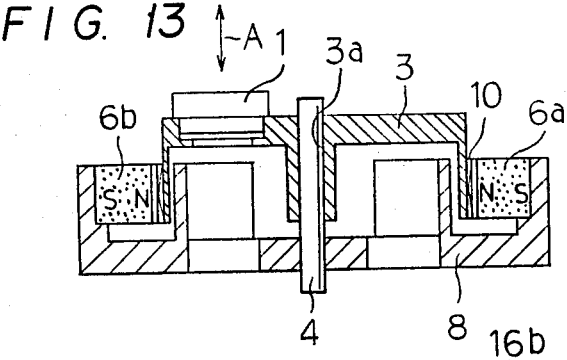
FIG. 13 is a sectional view taken along the line 13—13 of FIG. 12.

FIG. 13 shows, in a sectional view, the objective lens driving device of FIG. 12. The objective lens 1 may be moved in the direction shown by the arrow A by flowing a certain current through the focusing coil 10.

Figure 14:
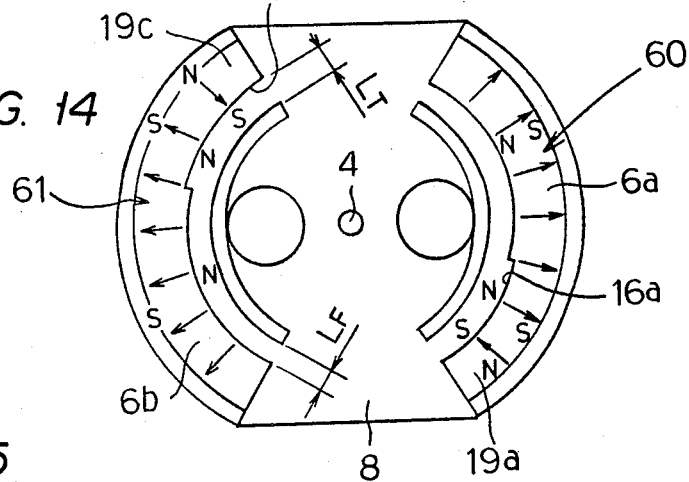
FIG. 14 is a plan view of the permanent magnets each provided with a recess for receiving a tracking coil.

FIG. 14 shows the directions of fluxes running through the disk-shaped yoke 8. That is, in FIG. 13, a flux flows from the north pole through the focusing coil 10 and the yoke 8 to the south pole.

Figure 15:
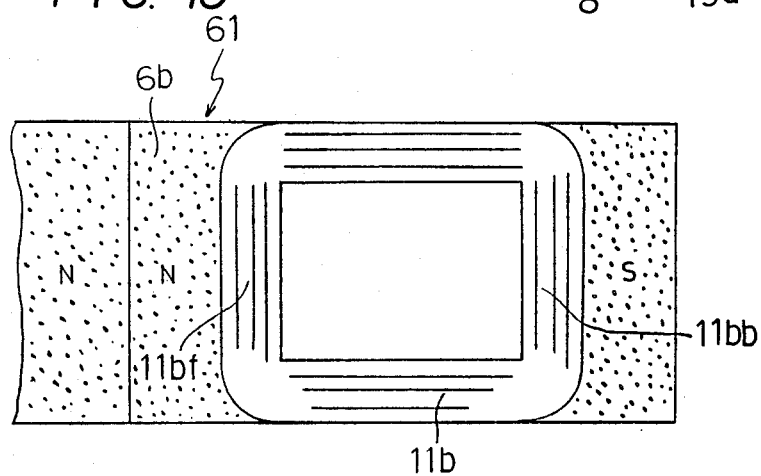
FIG. 15 is a side view of the tracking coil mounted on the recess.

FIG. 15 shows the tracking coil 11b in more detail. The north pole of the main section 6b opposes the coil side 11bf which is parallel to the shaft 4, while the south pole of the end section 19c opposes the other coil vertical side 11bb. As described above, both the side coils 11bf and 11bb produce tracking forces in the same direction. According to this embodiment, the clearance LF may be made narrow so that the main sections 6a and 6b provide the increased flux density for the tracking coils and the focusing coil. Thus, focus control is made with larger forces.

When the tracking coils are mounted on the side of a focusing coil, the gap between the permanent magnets 6a and 6b and the focusing coil 10 is large, making it difficult to provide sufficient force to control the focusing of an objective lens. According to this embodiment, the recesses 16a and 16b are provided for accommodating the tracking coils 11a and 11b so that the gaps between the permanent magnets and the tracking coils 11a and 11b and the permanent magnets and the focusing coil are minimized.

Figure 16:
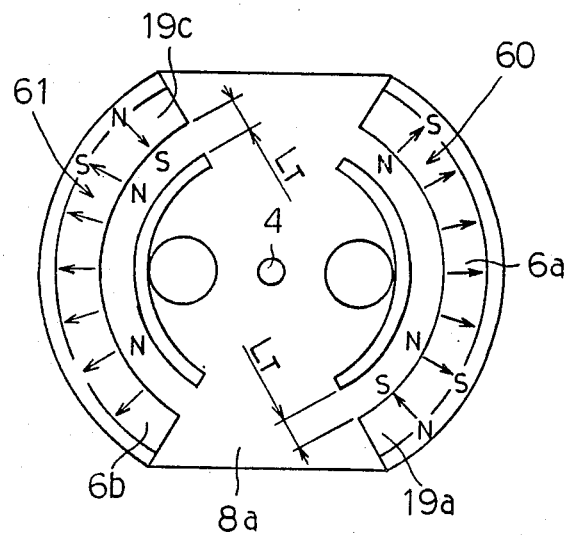
FIG. 16 is a plan view of permanent magnets each provided with a recess according to another embodiment of the invention.
Figure 17:
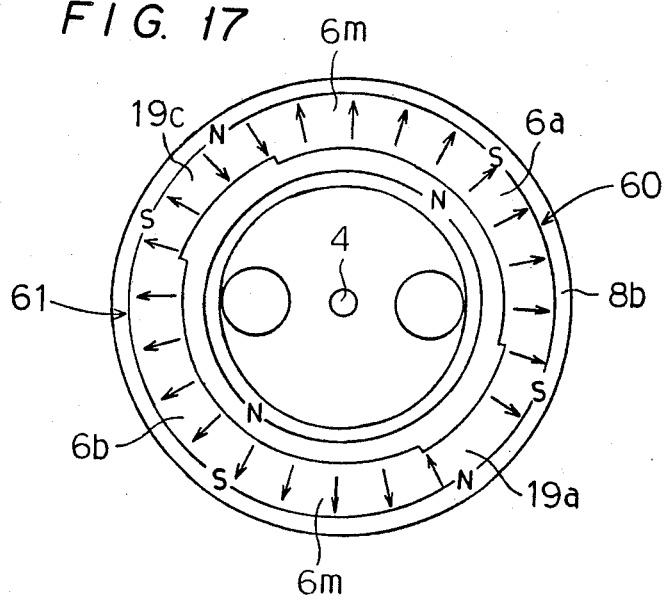
FIG. 17 is a plan view of a circular permanent magnet according to still another embodiment of the invention.

If sufficient driving forces are obtained, the above recesses are unnecessary as shown in FIG. 16. The permanent magnets 60 and 61 may be connected with a pair of permanent magnets to form a ring-shaped permanent magnet 6m as shown in FIG. 17, which is mounted inside the outer yoke 8b. This ring-shaped permanent magnet 6m makes its positioning easier as well as its efficiency higher.

Figure 18:
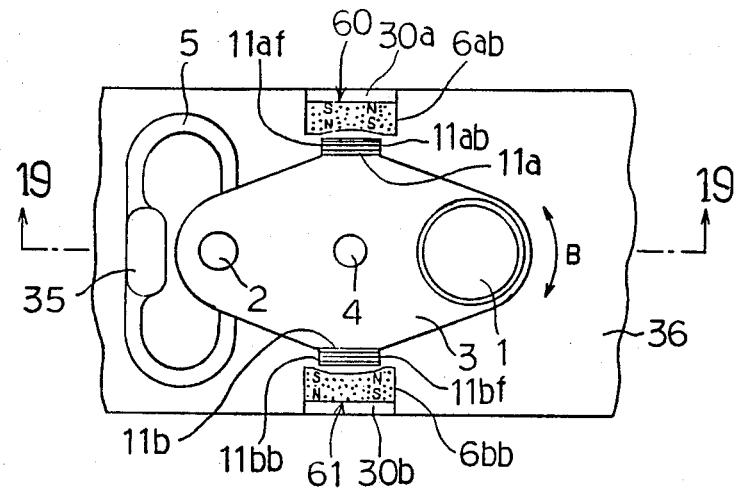
FIG. 18 is a plan view of an objective lens driving device according to another embodiment of the invention.
Figure 19:
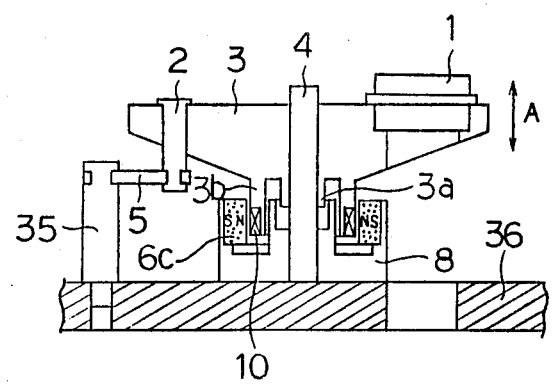
FIG. 19 is a sectional view taken along the line 19—19 of FIG. 18.
Figure 20:
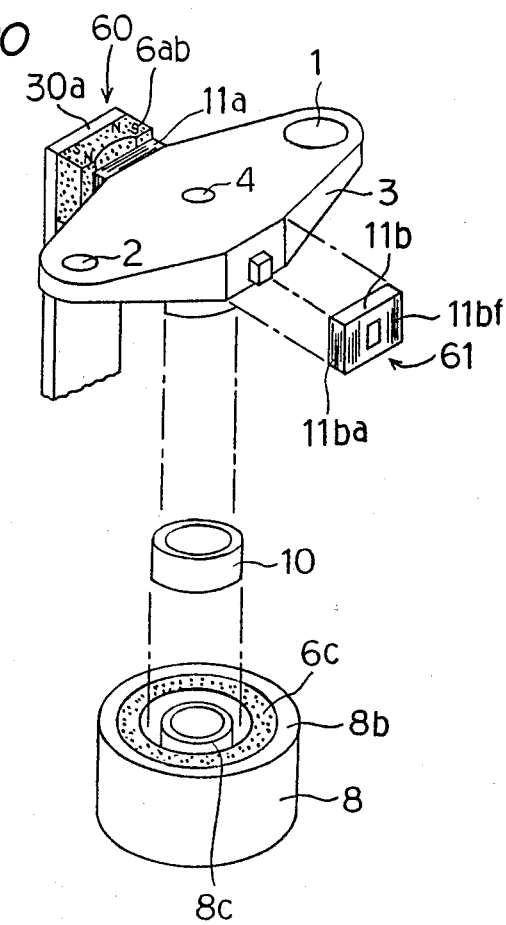
FIG. 20 is an exploded view of the objective lens driving device of FIG. 18.

FIGS. 18, 19, and 20 show an objective lens driving device according to still another embodiment of the invention. In this driving device, a focusing coil 10 and a permanent magnet 6c for supplying the focusing coil 10 with a magnetic flux, and a pair of tracking coils 11a and 11b and a pair of permanent magnets 60 and 61 for supplying the tracking coils 11a and 11b with magnetic fluxes, respectively, are provided separately.

An objective lens 1 and a counter weight 2 are mounted on a lens holder 3, which is pivoted by a supporting shaft 4 on a base 36 through a bearing 3a so that the lens holder 3 is supported at a constant distance from the base 36. A ring-shaped elastic holder 5 connects the lower end of the counter weight 2 and the top of a post 35 which is set upright on the base 36. A cylindrical coil mount 3b extending downwardly from the bottom of the lens holder 3 is made concentric with the tubular bearing 3b. The focusing coil 10 is wound in a cylindrical shape and mounted on the coil mount 3b.

Figure 21:
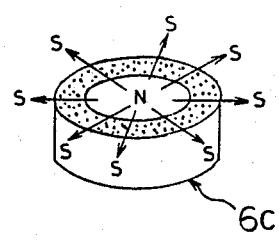
FIG. 21 is a perspective view of the permanent magnet useful for the driving device of FIG. 18.

As best shown in FIG. 20, a pair of tracking coils 11a and 11b, each wound in a rectangular shape, are mounted on the respective flattened sides of the lens holder 3. The focusing coil 10 is mounted in the magnetic field produced by the ring-shaped permanent magnet 6c which is placed between the cylindrical inner and outer yokes 8c and 8b. The tracking coil 11a or 11b is placed in a magnetic field formed by a tracking permanent magnet 6ab or 6bb and a tracking yoke 30a or 30b which extends upwardly from the base 36. The focusing magnet 6c and the tracking magnets 6ab and 6bb may be made of plastic magnet. The focusing magnet 6c is magnetized in the radial direction from the center to the outside as shown in FIG. 21. The tracking magnets 6ab and 6bb are made by bipolar magnetization techniques so that each magnet has a pair of submagnets, each having a polarity opposite to the other one. Thus, the permanent magnet 6ab supplies the coil sides 11ab and 11af with magnetic fluxes in opposite directions. Similarly, the permanent magnet 6bb supplies the coil sides 11bb and 11bf with magnetic fluxes in opposite directions.

In operation, by flowing a certain current through the focusing coil 10, the lens holder 3 may be moved in the direction shown by an arrow A in FIG. 19 to adjust the focal length. By flowing a certain current through the tacking coils 11a and 11b, the lens holder 3 may be rotated in either direction shown by an arrow B in FIG.

18 to provide tracking. Since the ends of each permanent magnet 6ab or 6bb have different polarities, electromagnetic forces acting on the coil sides 11ab and 11af, or 11bb and 11bf are oriented in the same direction, thus increasing the efficiency of the tracking coils 11a and 11b.

Figure 22:
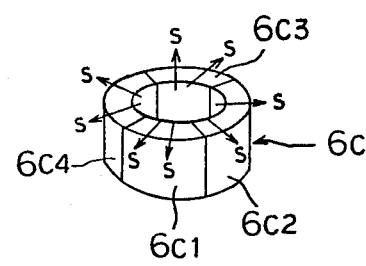
FIG. 22 is a perspective view of a permanent magnet made up of several magnet pieces.
Figure 23:
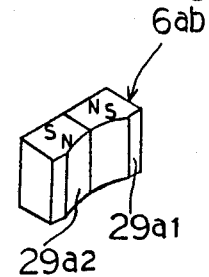
FIG. 23 is a perspective view of a tracking magnet made up of a pair of magnet pieces.

The permanent magnets 6c, 6ab, and 6bb may be further miniaturized by using rare earth elements. They may be made in one piece. Alternatively, the focusing magnet 6c may be made up of a number of, for example, four curved magnet pieces 6c1-6c4 as shown in FIG. 22, and the tracking magnet 6ab may be made of a pair of magnet pieces 29a1 and 29a2 as shown in FIG. 23. By increasing the number of curved magnet pieces, the magnetization of each piece may be made in the thicknesswise direction. That is, it is not always necessary to make magnetization in the radial direction.

Figure 24:
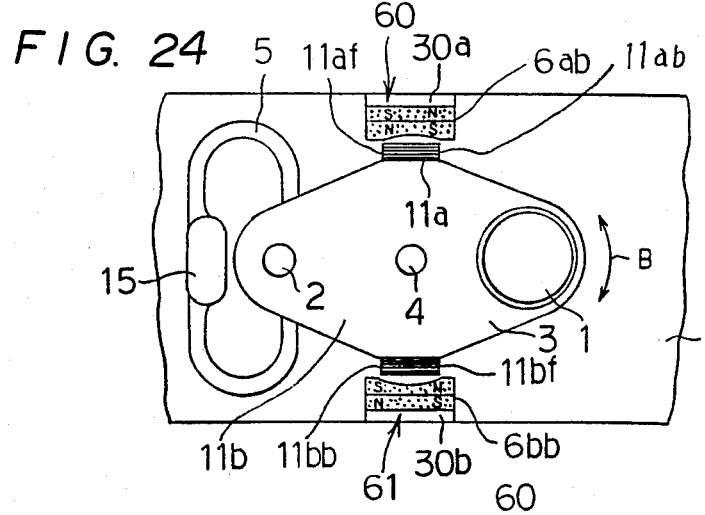
FIG. 24 is a plan view of an objective lens driving device according to still another embodiment of the invention.
Figure 25:
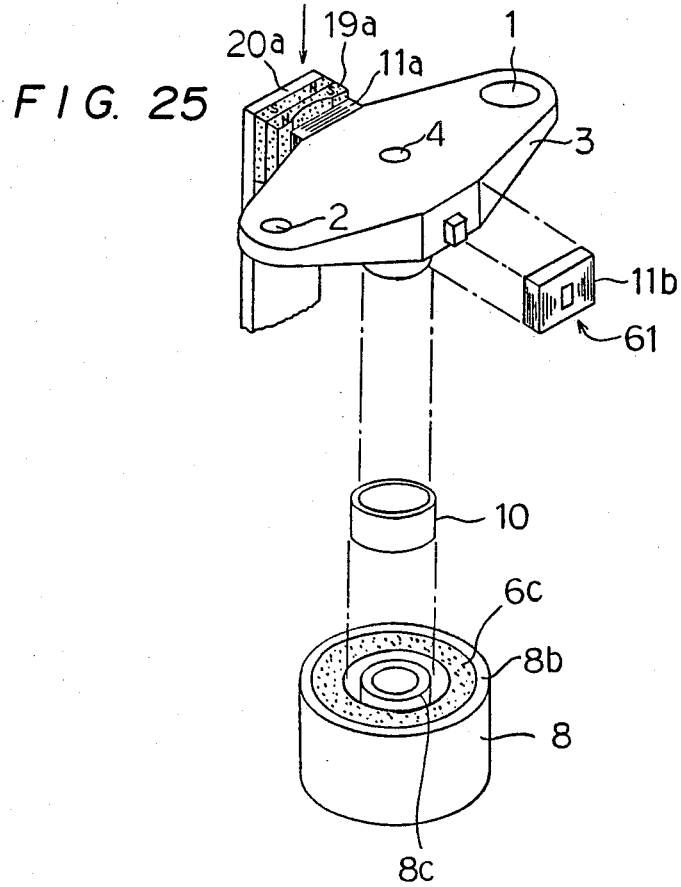
FIG. 25 is an exploded perspective view of the driving device of FIG. 24.

Alternatively, the permanent magnets may be provided on the lens holder while the focusing and tracking coils may be provided on the yokes. The permanent magnets 6ab and 6bb each may be made of a pair of permanent magnets joined with their polarities oriented in opposite directions as shown in FIGS. 24 and 25.

Figure 26:
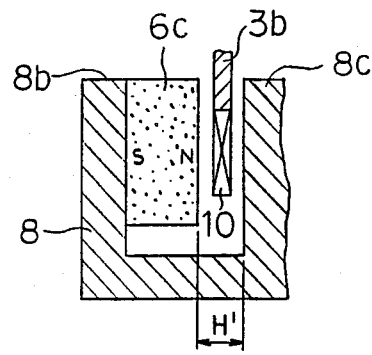
FIG. 26 is a sectional view of part of the permanent magnet of FIG. 25.
Figure 27:
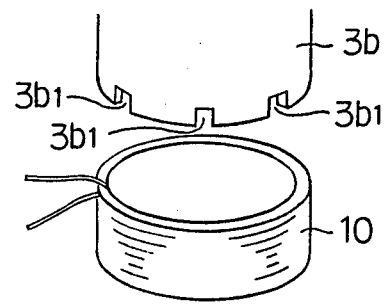
FIG. 27 is a perspective view of a notched cylindrical coil mount.
Figure 28:
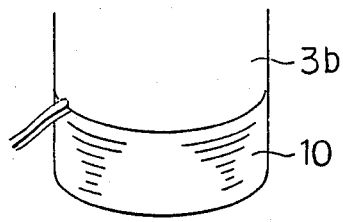
FIG. 28 is a perspective view of an integral cylindrical coil mount.

As shown in FIGS. 26-28, the cylindrical coil mount 3b may be provided with a number of notches 3b1 on the lower edge to accommodate an adhesive agent so that the ring-shaped coil 10 may be bonded to the lower edge of the coil mount 3b. Alternatively, by using a plastic material, the cylindrical coil mount 3b may be formed integrally with the annular focusing coil 10. With this structure, the focusing coil 10 is the only factor that determines the gap H' between the permanent magnet 6c and the inner yoke 8c. Thus, it is possible to make the gap H' very small.

In the embodiments of FIGS. 18-28, the magnetic circuit facing the focusing coil may be arranged along the entire circumference of the focusing coil, thus increasing the efficiency of the focusing coil. Since the focusing and tracking coils are separately mounted in each magnetic circuit so that it is possible to reduce the gap between the permanent magnet and the yoke, thus increasing the magnetic flux density. This makes it possible to miniaturize the focusing permanent magnet and to reduce the unit manufacturing cost. In addition, the ring-shaped focusing magnet is easy to make.

The tracking magnets each have at least a pair of magnet sections, each of which drives either coil side in the same direction so that the efficiency of the tracking coil is improved, thus reducing the size of the permanent magnets. Moreover, the tracking coils have a simple structure, which makes the winding operation very easy.

What is claimed is:

1. An objective lens driving device with a multipole magnet, which comprises:
   a yoke having a disk-shaped base section, an inner central yoke section with a central hole therein, and an outer cylindrical yoke section;
   a supporting shaft set upright in said central hole of said inner central yoke section;
   a lens holder with a central aperture fitted over said supporting shaft for rotary movement about and vertical movement along said supporting shaft and having a cylindrical coil mount extending downwardly therefrom;
   a ring-shaped focusing coil mounted around said cylindrical coil mount for moving said lens holder along said supporting shaft for effecting focusing;
   at least one rectangular tracking coil attached to a side of said focusing coil such that a pair of vertical coil sides of said tracking coil are parallel to said supporting shaft; and
   curved multipole magnet means disposed between said inner and outer yoke sections and having at least three magnet sections, with opposite end magnet sections having a polarity opposite to that of a central magnet section so that said vertical coil sides interlink with magnetic fluxes having substantially opposite directions to each other, whereby forces act upon said vertical coil sides in substantially same direction.

2. The objective lens driving device with a multipole magnet of claim 1 wherein said curved multipole magnet means is provided with at least one recess for receiving said tracking coil, thus minimizing the gap between said multipole magnet means and said inner yoke section.

3. The objective lens driving device with a multipole magnet of claim 1 wherein said multipole magnet means is made of plastic.

4. The objective lens driving device with a multipole magnet of claim 1 wherein said cylindrical coil mount has at least one notch at its lower edge.

5. The objective lens driving device with a multipole magnet of claim 1 wherein said cylindrical coil mount is made integrally with said focusing coil.

6. An objective lens driving device with a multipole magnet, which comprises:
   a yoke having a disk-shaped base section, a central yoke section with a central hole, and at least three flat yoke sections;
   a supporting shaft set upright in said central hole of said central yoke section;
   a lens holder with a central aperture fitted over said supporting shaft for rotary movement about and vertical movement along said supporting shaft and having a cylindrical coil mount extending downwardly therefrom;
   a ring-shaped focusing coil mounted around said cylindrical coil mount for moving said lens holder along said supporting shaft for effecting focusing;
   at least one rectangular tracking coil attached to a side of said focusing coil such that a pair of vertical coil sides of said tracking coil are parallel to said supporting shaft; and
   curved multipole magnet means sandwiched between said disk-shaped yoke section and said three flat yoke sections and having at least three magnet sections, with opposite end magnet sections having a polarity opposite to that of a central magnet section so that said vertical coil sides interlink with magnetic fluxes having substantially opposite directions to each other whereby forces act upon said vertical coil sides in substantially same direction.

7. The objective lens driving device with a multipole magnet of claim 6 wherein said curved multipole magnet means is provided with at least one recess for receiving said tracking coil, thus minimizing the gap between said multipole magnet means and said inner yoke section.

8. The objective lens driving device with a multipole magnet of claim 6 wherein said multipole magnet means is made of plastic.

9. The objective lens driving device with a multipole magnet of claim 6 wherein said cylindrical coil mount has at least one notch at its lower edge.

10. The objective lens driving device with a multipole magnet of claim 6 wherein said cylindrical coil mount is made integrally with said focusing coil.

11. An objective lens driving device with a multipole magnet, which comprises:

a yoke having a disk-shaped base section, an inner central yoke section with a central hole therein, and an outer cylindrical yoke section;

a supporting shaft set upright in said central hole of said inner central yoke section;

a lens holder with a central aperture fitted over said supporting shaft for rotary movement about and vertical movement along said supporting shaft and having a cylindrical coil mount extending downwardly therefrom;

a ring-shaped focusing coil mounted on said cylindrical coil mount for moving said lens holder along said supporting shaft for effecting focusing;

curved multipole magnet means disposed between said inner and outer yoke sections;

at least one rectangular tracking coil attached to a side of said lens holder such that a pair of vertical coil sides of said tracking coil are parallel to said supporting shaft; and tracking multipole magnet means disposed in the vicinity of said tracking coil and having at least two magnet sections having a polarity opposite to that of an adjacent magnet section so that said vertical coil sides interlink with magnetic fluxes having substantially opposite directions to each other whereby forces act upon said vertical coil sides in substantially same direction.

12. The objective lens driving device with a multipole magnet of claim 11 wherein said curved multipole magnet means is provided with at least one recess for receiving said tracking coil, thus minimizing the gap between said multipole magnet means and said inner yoke section.

13. The objective lens driving device with a multipole magnet of claim 11 wherein said multipole magnet means is made of plastic.

14. The objective lens driving device with a multipole magnet of claim 11 wherein said cylindrical coil mount has at least one notch at its lower edge.

15. The objective lens driving device with a multipole magnet of claim 11 wherein said cylindrical coil mount is made integrally with said focusing coil.

* * * * *